United States Patent
Leong et al.

(10) Patent No.: US 9,628,460 B2
(45) Date of Patent: Apr. 18, 2017

(54) METHOD OF CONTROLLING ACCESS TO AN INTERNET-BASED APPLICATION

(75) Inventors: Chik Weng Leong, Kuala Lampur (MY); Chee Hoo Lau, Kuala Lampur (MY); Yuen Len Kong, Kuala Lampur (MY); Tau Wei Phang, Kuala Lampur (MY); Hoon Sin Cheong, Kuala Lampur (MY)

(73) Assignee: E-LOCK CORPORATION SDN. BHD., Kuala Lumpur (MY)

( * ) Notice: Subject to any disclaimer, the term of this patent is extended or adjusted under 35 U.S.C. 154(b) by 158 days.

(21) Appl. No.: 14/345,878

(22) PCT Filed: Feb. 16, 2012

(86) PCT No.: PCT/MY2012/000024
§ 371 (c)(1),
(2), (4) Date: Mar. 19, 2014

(87) PCT Pub. No.: WO2013/043035
PCT Pub. Date: Mar. 28, 2013

(65) Prior Publication Data
US 2014/0230038 A1    Aug. 14, 2014

(30) Foreign Application Priority Data
Sep. 19, 2011  (MY) .............................. PI2011004430

(51) Int. Cl.
*G06F 7/04*       (2006.01)
*G06F 15/16*      (2006.01)
(Continued)

(52) U.S. Cl.
CPC ............ *H04L 63/08* (2013.01); *H04L 9/3215* (2013.01); *H04L 63/0853* (2013.01);
(Continued)

(58) Field of Classification Search
CPC ..... H04L 63/083; H04L 63/10; H04L 63/107; H04L 63/1408; H04W 12/00; H04W 12/06; H04W 12/08; H04W 12/12
See application file for complete search history.

(56) References Cited

U.S. PATENT DOCUMENTS 7,778,932 B2\*  8/2010  Yan ...................... G06Q 20/382
                                                          705/64
7,797,734 B2\*  9/2010  Babi et al. ........................ 726/4
(Continued)

FOREIGN PATENT DOCUMENTS

WO       2007/050932 A2    5/2007

*Primary Examiner* — Daniel Potratz
(74) *Attorney, Agent, or Firm* — Ladas & Parry LLP

(57) ABSTRACT

A novel method of dealing with the problem of phishing, pharming, key-logging and man-in-the-middle attacks on internet-based applications which require the submission of valid login credentials, by permitting a user to control access to an internet-based application (3) (such as an internet banking website) by the simple transmission of a command via the internet to allow access to the internet-based application (3) whenever the user wishes to access the application, and by transmitting a command via the internet to deny access to the internet-based application at all other times, to prevent unauthorized access by any unscrupulous parties.

15 Claims, 6 Drawing Sheets

(51) Int. Cl.
    *G06F 17/30*     (2006.01)
    *H04L 29/06*     (2006.01)
    *H04W 12/08*     (2009.01)
    *H04W 12/06*     (2009.01)
    *H04W 12/00*     (2009.01)
    *H04L 9/32*     (2006.01)

(52) U.S. Cl.
    CPC ........... *H04W 12/00* (2013.01); *H04W 12/06* (2013.01); *H04W 12/08* (2013.01); *H04L 63/0876* (2013.01); *H04L 63/18* (2013.01)

(56) References Cited

U.S. PATENT DOCUMENTS

| | | | |
|---|---|---|---|
| 8,374,634 B2* | 2/2013 | Dankar | G06Q 20/3224 370/328 |
| 8,756,657 B2* | 6/2014 | Bijlsma | 726/3 |
| 2004/0148259 A1* | 7/2004 | Reiners et al. | 705/42 |
| 2010/0299731 A1 | 11/2010 | Atkinson | |
| 2011/0219427 A1* | 9/2011 | Hito | G06F 21/00 726/3 |

* cited by examiner

METHOD OF CONTROLLING ACCESS TO AN INTERNET-BASED APPLICATION

RELATED APPLICATION INFORMATION

This application is a 371 of International Application PCT/MY2012/000024 filed 16 Feb. 2012 entitled "Method Of Controlling Access To An Internet-Based Application", which was published in the English language on 28 Mar. 2013 with International Publication Number WO 2013/043035 A1 and which claims priority from Malaysian Patent Application PI 2011004430, filed 19 Sep. 2011, the content of which is incorporated herein by reference.

FIELD OF INVENTION

The present invention relates to controlling access to internet-based applications, such as the website of an online service provider.

BACKGROUND

With the introduction of the internet, and the unprecedented access it provides to users, all manner of service providers have steadily been moving towards the provision of online services. Online banking, commerce services, shopping, web-based email accounts, etc. are all commonplace in this present day and age.

The introduction and proliferation of wireless broadband infrastructure and services has since provided users with connectivity to the internet while on the move, expanding the use of online services. This has also provided the impetus for the development and introduction of a myriad of portable internet-capable devices by numerous manufacturers, ranging from laptop personal computers to mobile telephones with internet and data capability.

The development of such portable devices continues unabated, and in the past 10 years we have seen the introduction of a new generation of portable internet-capable devices known as Smartphone, which have continuously evolved and seen continuous increases in computing power and internet connectivity, which has further revolutionized the internet. The term Smartphone is generally used to refer to a mobile telephone which possesses advanced computing ability and internet connectivity, and Smartphones are now ubiquitous and very much part and parcel of everyday life.

With this new and unprecedented level of connectivity to the internet, however, comes the parallel and never ending task of data security, which not only includes securing web pages and online databases, but also ensuring that a user is able to securely access an internet-based application, particularly those with financial or commercial implications.

Since the introduction of online services through the internet, online service providers have been continuously dueling with unscrupulous parties seeking ways to gain illegal access to user accounts by means of identity theft, which basically involves stealing a user's personal online identity and password for a specific online service. Known methods used by these unscrupulous parties include phishing, pharming, key-logging and man-in-the-middle attacks.

Phishing refers to the process of tricking a user of an online service into believing that a fraudulent website (i.e., a spoof) created by an unscrupulous party, is an online service provider's genuine website, and subsequently revealing their personal online identity and password to the unscrupulous party.

In practice, a phishing attack will commence with an email with fraudulent content being sent to potential victims in the hope that some of the recipients will visit a fraudulent website that very closely resembles or mirrors the appearance of a genuine website. A victim is then tricked into inputting and submitting their user ID and password, which falls into the hands of the unscrupulous party.

Pharming is a more advanced technique of identity theft with the same objective as that of phishing. Instead of distributing fraudulent emails and exploiting user ignorance, pharming discretely diverts users who are trying to visit a genuine website to a look-alike fraudulent website where their identity will be stolen.

Key-logging is a technique used to steal user IDs and passwords when users submit these login credentials to the genuine website. This is usually accomplished by first infecting the user's personal computer or internet capable device with spyware or a Trojan Horse that records the keystrokes of the user. The recorded keystroke data will include the user ID and password frequently typed by the user, which will be periodically sent to the unscrupulous party.

A man-in-the-middle attack involves placing a so-called man-in-the-middle (MIM) between a user and a targeted online service provider's website. Typically, the MIM will relay information between a user and the online service provider's website to an unscrupulous party seeking to steal the user's login credentials, or even to hijack a login session.

The strength of a man-in-the-middle attack is such that a user will think that the MIM is in fact the online service provider's website, since all the information presented appears to be correct, and similarly, the online service provider will assume that it is communicating directly with the user since all of the login credentials are correct.

A man-in-the-middle attack is clearly an advanced form of attack that is capable of circumventing many two-factor authentication schemes which requires a user to submit additional authentication codes, because an unsuspecting user is unaware that they are actually submitting the additional authentication information through a man-in-the-middle.

There are presently a number of known countermeasures to the forms of identity theft described above, but most, at best merely offer a partial solution to the problem, are too cumbersome to implement, or are simply too costly. For example:

- A spam filter is only good for blocking email-based phishing, but is ineffective against pharming.
- A question and answer challenge response is still vulnerable to phishing because a user can through ignorance, be tricked into revealing such information.
- Server identification by displaying a known secret text or image of the user does not prevent key-logging, and simply fails where there is a man-in-the-middle between the user and the online service provider's web server.
- Token-based authentication (both hardware tokens and SMS-based tokens) prevent common phishing and pharming, but is still vulnerable to an advanced man-in-the-middle attack.
- Client digital certificates and smart cards are strong authentication solutions, but these are also cumbersome to manage or costly to deploy on a large scale, when one considers the sheer numbers of internet capable devices in service which continue to increase exponentially, and the rapidly expanding connectivity and usage of the internet.

WO 2007/050932 A2 discloses a method of controlling access to internet-based applications, specifically systems and methods for controlling access to internet-based applications through the use of out-of-band signaling, and, in particular, telephony networks. In WO 2007/050932 A2, the likelihood of fraudulent or unauthorized use of an internet-based application is reduced by giving a user the ability to enable or disable processing of their login credentials through the use of telephony.

The reliance of the disclosed systems and methods on telephony networks has the disadvantage of requiring a user to make telephone calls, thus incurring additional cost which may be particularly significant for a user who travels frequently. A further disadvantage is the need for a user to be familiar with or to memorize several code sequences, which may be considered problematic for some. Furthermore, the need to input a sequence of key-strokes requires more effort and is susceptible to a wrong digit being entered, which may result in system errors or at the very least, the need to repeat the procedure.

In view of the obvious disadvantages of the known countermeasures above, there is an unfulfilled need for a method of controlling access to an internet-based application to supplement a user's existing login credentials, which may be deployed at a wide scale and at an acceptable cost, and which offers an improvement over the prior art described above.

SUMMARY OF THE INVENTION

In one embodiment of the present invention, the method of controlling access to an internet-based application which requires the submission of valid login credentials by a registered user using a first internet-capable device (suitably, a personal computing device such as a personal computer, laptop or tablet) comprises the user first initiating the transmission via the internet of a command comprising a unique authentication code by a second internet-capable device (suitably, a mobile device such as a Smartphone) associated to the user.

The command may be generated by the registered user activating a device-based application on the second device. The command is received by an authentication server which determines the identity of the second internet-capable device by comparing the unique authentication code with a list of such codes that are stored in a database. Each code is associated with a particular registered user.

The unique authentication code may comprise a unique identification code that is integral to the second device.

Upon validly determining the identity of a registered user, the authentication server sets an access control status based on the command received. Based on the control status, the server determines access to the application upon submission of the valid login credentials through the first internet-capable device.

A registered user would send a command for allowing access when he/she wishes to login to the internet-based application, or a command denying access to the internet-based application to prevent unauthorized access after logging out of the internet-based application.

In another embodiment, the method of controlling access to an internet-based application includes the additional procedures of the authentication server comparing the respective geographical locations of the first and second internet-capable devices, and determining whether the geographical locations of both devices are in proximity to one another, before setting an access control status based on the command received.

In view of the advanced capabilities and high levels of internet-connectivity afforded by current generations of portable devices, a registered user may conceivably make use of the same internet-capable device (typically a portable device, such as a Smartphone) to access the internet-based application, instead of a separate device (typically a personal computer or laptop).

Thus, in a further embodiment of the present invention, a registered user utilizes the same device to access the internet-based application and for the transmission of the command comprising a unique authentication code.

In such an embodiment, the method of controlling access on his/her device to an internet-based application which requires the submission of valid login credentials by a registered user using an internet-capable device associated with a registered user comprises the user first initiating the transmission of a command comprising a unique authentication code by the device.

The command received is generated by the registered user activating a device-based application on the device, and is received by an authentication server which determines the identity of the internet-capable device by comparing the unique authentication code with a list of such codes that are stored in a database, since each code is associated with a particular registered user.

The unique authentication code may comprise a unique identification code that is integral to the device.

Upon validly determining the identity of a registered user, the authentication server sets an access control status based on the command received, and based on the control status, determines access to the application upon submission of the valid login credentials through the internet-capable device.

A registered user would send a command for allowing access when he/she wishes to login to the internet-based application, or a command denying access to the internet-based application to prevent unauthorized access after logging out of the internet-based application.

In this embodiment, the command received is generated by the registered user activating a device-based application on the internet-capable device, and the unique authentication code comprises a unique identification code that is integral to the device used.

In all embodiments, the unique authentication code described in the preferred embodiments may also comprise of a user identifier associated with the registered user, and may be encrypted by the device-based application for added security.

The unique identification code may depend on the type of the device used, and may be the International Mobile Equipment Identifier (IMEI), Mobile Equipment Identifier (MEID) or Electronic Serial Number (ESN) of the device. Alternatively, if the device is Bluetooth®-enabled, the device's unique Bluetooth® address could be used.

Put very simply, the present invention provides a method of "switching ON" and "switching OFF" the access to an internet-based application by the novel usage of an ubiquitous internet-capable device such as a Smartphone, as one component of a two-factor authentication scheme.

The login credentials serve as something the registered user uniquely knows, and the device or second device serves as something the registered user uniquely has and which can be identified as such by reference to the unique device serial code.

In a further aspect, the invention provides a personal internet-capable device comprising a device-based application for controlling access to an internet-based application by a registered user of the internet-based application, the device-based application being adapted to read a unique identification code integral to the device, and generate and transmit a command comprising the unique identification code via the internet to a computer server; wherein activation of the device-based application to transmit said command signals to the computer server the user's intention to enable access or to disable access to the internet-based application.

In yet another aspect, the invention provides a device-based application for use on a personal internet-capable device to control access to an internet-based application by a registered user of the internet-based application. When access is enabled, the internet-based application may then be accessed through the same device or another internet-capable device.

In an embodiment of this aspect of the invention, the device-based application is adapted to determine the location of the device on which it is installed, and to transmit the location data as part of the access control process.

The present invention thus provides a novel method of dealing with the problem of phishing, pharming, key-logging and man-in-the-middle attacks on internet-based applications which require the submission of valid login credentials, by permitting a user to control access to an internet-based application (such as an internet banking website) by the simple transmission of a command via the internet to allow access to the internet-based application whenever the user wishes to access the application, and by transmitting a command via the internet to deny access to the internet-based application at all other times, to prevent unauthorized access by any unscrupulous parties.

BRIEF DESCRIPTION OF THE DRAWINGS

The invention is illustrated, though not limited by the following description of embodiments that are being given by way of example only, with reference to the accompanying drawings in which.

DETAILED DESCRIPTION

Figure 1:
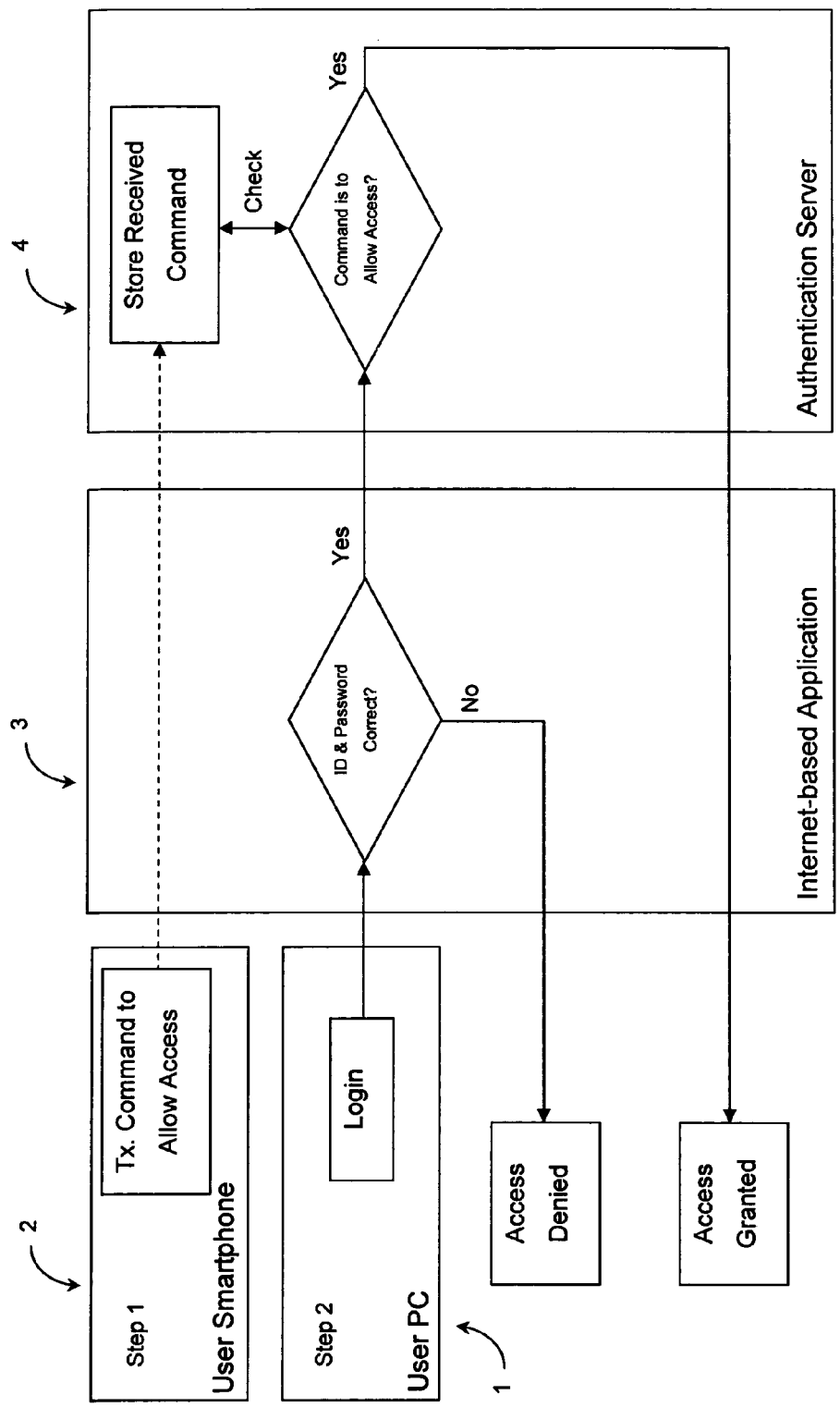
FIG. 1 is a flow chart illustrating a first embodiment of the invention when the user first initiates the transmission of a command by a second internet-capable device to allow access to an internet-based application by a first internet-capable device.

In the first embodiment, the method involves controlling the access to an internet-based application 3 requiring the submission of valid login credentials by a registered user through a first internet-capable device 1, and the method comprises the steps of:

a) a computer server 4 receiving a command comprising a unique authentication code transmitted via the internet by a second internet-capable device 2 associated with the user, the transmission of that code being initiated by the user;

b) the computer server 4 determining the identity of the second device 2 by comparing the received code with a plurality of such codes that are stored in a database, each code associated with a different registered user of the application;

c) the computer server 4 setting an access control status based on said command, upon validly determining the identity in step b); and d) the computer server 4, based on the access control status, determining access to the application 3 upon submission of the valid login credentials through the first device 1.

The first internet-capable device 1 which is used by a registered user to access the internet-based application 3 may typically be a personal computer, laptop or tablet.

The internet-based application 3 accessed by the registered user would typically be an online service provider's website, such as an internet banking website. The login credentials typically consist of a user ID and a password.

The second internet-capable device 2 used by the registered user to transmit the command would typically be a portable or mobile device such as a Smartphone which belongs to a registered user.

The command transmitted by the second internet-capable device 2 is generated by the registered user activating a device-based application on the second internet-capable device. Since the second internet-capable device is typically a Smartphone, the device-based application may take the form of a specialized Smartphone application, commonly known as an 'app'.

The device-based application is provided to a user as part of the process of registering a user account with the online service provider's website 3, which will also involve associating the user's account with identifiers associated to the user and the user's second internet-capable device 2. In practice, an online service provider will maintain a secure database of the user identifier and Smartphone identifier of every registered user, which will be used to determine and authenticate the identity of a registered user.

The computer server 4 may typically be an authentication server linked to the online service provider's website which has access to the secure database mentioned in the preceding paragraph, although other server arrangements may be envisioned by a person skilled in the art.

A user identifier would generally take the form of a registered user's login credentials, such as a user ID or a password. In practice, any one or both of the user's login credentials may be used as a user identifier.

The authentication code which the command transmitted by the second internet-capable device 2 comprises, may in turn comprise a unique identification code that is integral to the second device, and preferably also include a user identifier associated with the registered user as well.

In view of the importance of the information which the authentication code comprises, the command transmitted may be encrypted by the device-based application for added security. A typical encryption scheme which may be utilized would be the SHA-1 hash function, or an Advanced Encryption Standard (AES) algorithm.

The unique identification code will depend on the type of the second internet-capable device 2, and may for example be the International Mobile Equipment Identifier (IMEI), Mobile Equipment Identifier (MEID) or Electronic Serial Number (ESN) of the second internet capable device. Alternatively, if the device is Bluetooth®-enabled, the device's unique Bluetooth® address could be used.

The first embodiment as described here may be modified to provide an additional level of authentication to further enhance security, by additionally comparing the geographical location of the first and second internet-capable devices.

In the second embodiment of the present invention, the method of controlling the access to an internet-based application 3 requiring the submission of valid login credentials by a registered user through a first internet-capable device 1 may further comprise prior to step c), the additional steps of:
the computer server 4 comparing the respective geographical locations of the first and second internet-capable devices; and
the computer server 4 determining whether the geographical locations of the first and second internet-capable devices are in proximity to one another.

In the second embodiment, the step of the computer server 4 setting an access control status based on the received command (i.e., step c)), may be further dependent upon determining that the geographical locations of the first and second internet-capable devices are in proximity to one another, within a predetermined threshold. As used herein the term "in proximity" would include the two locations being the same.

The geographical location of the first internet-capable device 1 which is typically a personal computer, laptop or tablet may be determined by the authentication server through analysis of the device's IP address, from which city and country level geographical location information may be derived.

The geographical location of the second internet-capable device 2 is received by the authentication server in the form of such data as satellite signals (e.g. GPS coordinates), mobile communication cell tower information, and Wi-Fi access point information which are extracted by the device-based application and transmitted by the second device. The received data information provides the authentication server with the geographical location of the second device in the form of city and country level information.

The second internet-capable device 2 repeatedly transmits the device's geographical location information for as long as the device-based application is active, to provide the authentication server with up-to-date information which is used as an additional check. In one embodiment, upon activating the device-based application so as to enable access, the primary access command is transmitted one time, followed by repeated transmissions of the geographical location data. The format of the signals that incorporate the geographical location data may be similar to that of the access command signal, in particular by including the unique identification code of the second device and/or the user's user identifier.

A person skilled in the art would doubtless be able to conceive other suitable techniques for analyzing, extracting and comparing geographical location information which are within the scope and the objective of the present invention.

The geographical location information transmitted by the second internet-capable device may also be encrypted for additional security. A typical encryption scheme which may be utilized would be the SHA-1 hash function, or an Advanced Encryption Standard (AES) algorithm.

FIG. 1 specifically illustrates the first embodiment of the invention when a registered user first initiates the transmission of a command by a second internet-capable device to allow access to an internet-based application by a first internet-capable device.

When a registered user of an online service provider's website 3 (such as an internet banking account) wishes to access his/her online account through a first internet-capable device 1 (such as his/her personal computer), the registered user will first transmit a command via the internet from a second internet-capable device 2 (such as his/her Smartphone) to allow access to his/her online account.

The command to allow access is received by the authentication server 4 which determines the identity of the second internet-capable device 2 by comparing the unique authentication code which the command comprises, with a list of such codes stored in a database. Upon determining that the second internet-capable device 2 indeed belongs to a registered user, the authentication server 4 will determine the identity of the registered user by verifying that the login credentials submitted by a registered user are valid, before the user is allowed to access his/her online account.

A registered user in other words uses a second internet-capable device 2 to "switch ON" access to his/her online account, in addition to submitting through a first internet-capable device 1, his/her valid login credentials which are authenticated before access to the user's online account is granted.

Figure 2:
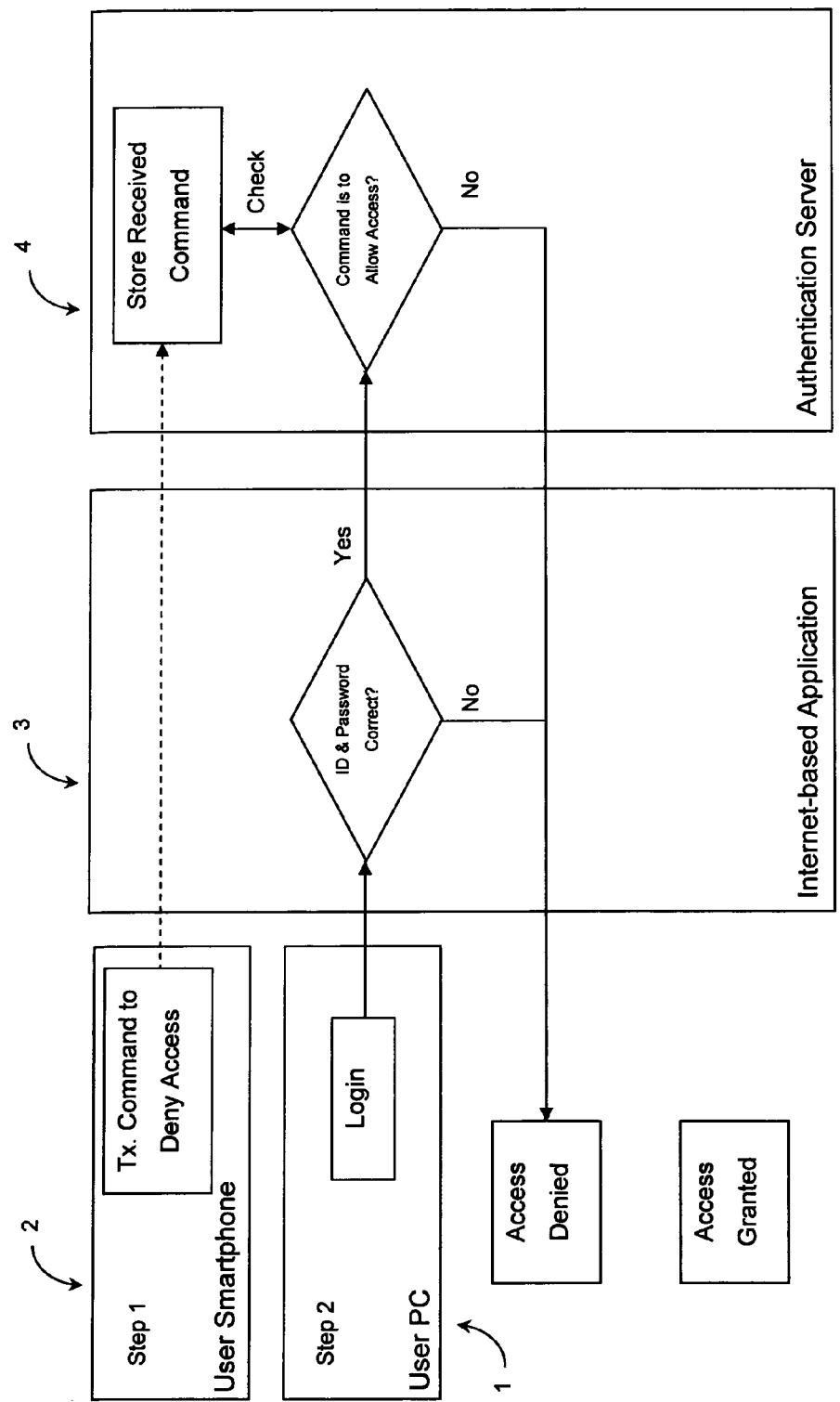
FIG. 2 is a flow chart illustrating the first embodiment of the invention when the user first initiates the transmission of a command by a second internet-capable device to deny access to an internet-based application.

FIG. 2 specifically illustrates the first embodiment of the invention when a registered user first initiates the transmission of a command by a second internet-capable device to deny access to an internet-based application.

When a registered user of an online service provider's website 3 (such as an internet banking account) wishes to deny access to his/her account, the registered user will first transmit a command from a second internet-capable device 2 (such as his/her Smartphone) to deny access to his/her online account.

The command to deny access is received by the authentication server which determines the identity of the second internet-capable device 2 by comparing the unique authentication code which the command comprises, with a list of such codes stored in a database. Upon determining that the second internet-capable device 2 indeed belongs to a registered user, the authentication server 4 will deny access to the registered user's online account. Hereafter, any attempt by the registered user or any other party to submit even valid login credentials will not result in access to the registered user's online account being granted.

A registered user in other words uses a second internet-capable 2 device to "switch OFF" access to his/her account. Once access has been denied, the submission of any login credentials through a first internet-capable device 1, valid or otherwise will be rejected.

Figure 3:
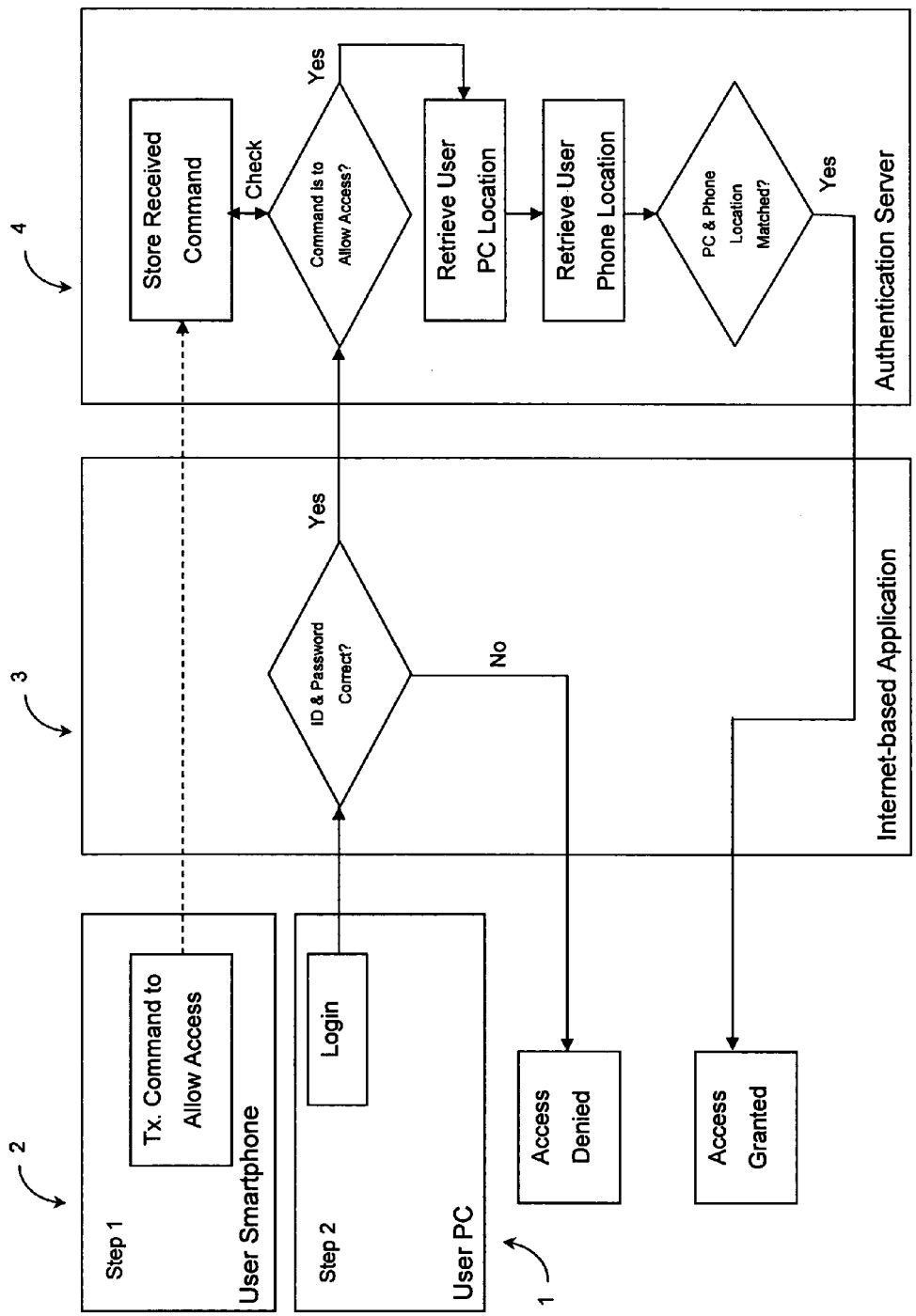
FIG. 3 is a flow chart illustrating a second embodiment of the invention when the user first initiates the transmission of a command by a second internet-capable device for allowing access to an internet-based application by a first internet-capable device, when the geographical locations of the first and second devices are in proximity to each other.

FIG. 3 specifically illustrates the second embodiment of the invention when a registered user first initiates the transmission of a command by a second internet-capable device to allow access to an internet-based application by a first internet-capable device, when the geographical locations of the first and second devices are in proximity to each other.

When a registered user of an online service provider's website 3 (such as an internet banking account) wishes to access his/her online account through a first internet-capable device 1 (such as his/her personal computer), the registered user will first transmit a command from a second internet-capable device 2 (such as his/her Smartphone) to allow access to his/her online account.

The command to allow access is received by the authentication server 4 which determines the identity of the second internet-capable device 2 by comparing the unique authentication code which the command comprises, with a list of such codes stored in a database.

The authentication server 4 will also determine the geographical locations of the first and second internet-capable devices, and compare whether the two devices are in proximity to each other.

The authentication server 4 does this by analyzing the first internet-capable device's IP address, and deriving city and country level geographical location information from the IP address, and receiving such data as the GPS coordinates, mobile communication cell tower information and Wi-Fi access point information transmitted by the second internet-capable device in the form of city and country level geographical location information.

Upon determining that the second internet-capable device 2 indeed belongs to a registered user, and determining that both the first and second internet-capable devices are in proximity to each other, i.e. in this specific embodiment that the city and country information tally for the two devices, the authentication server 4 will determine the identity of the registered user by verifying that the login credentials submitted by a registered user are valid, before the user is allowed to access his/her online account.

Figure 4:
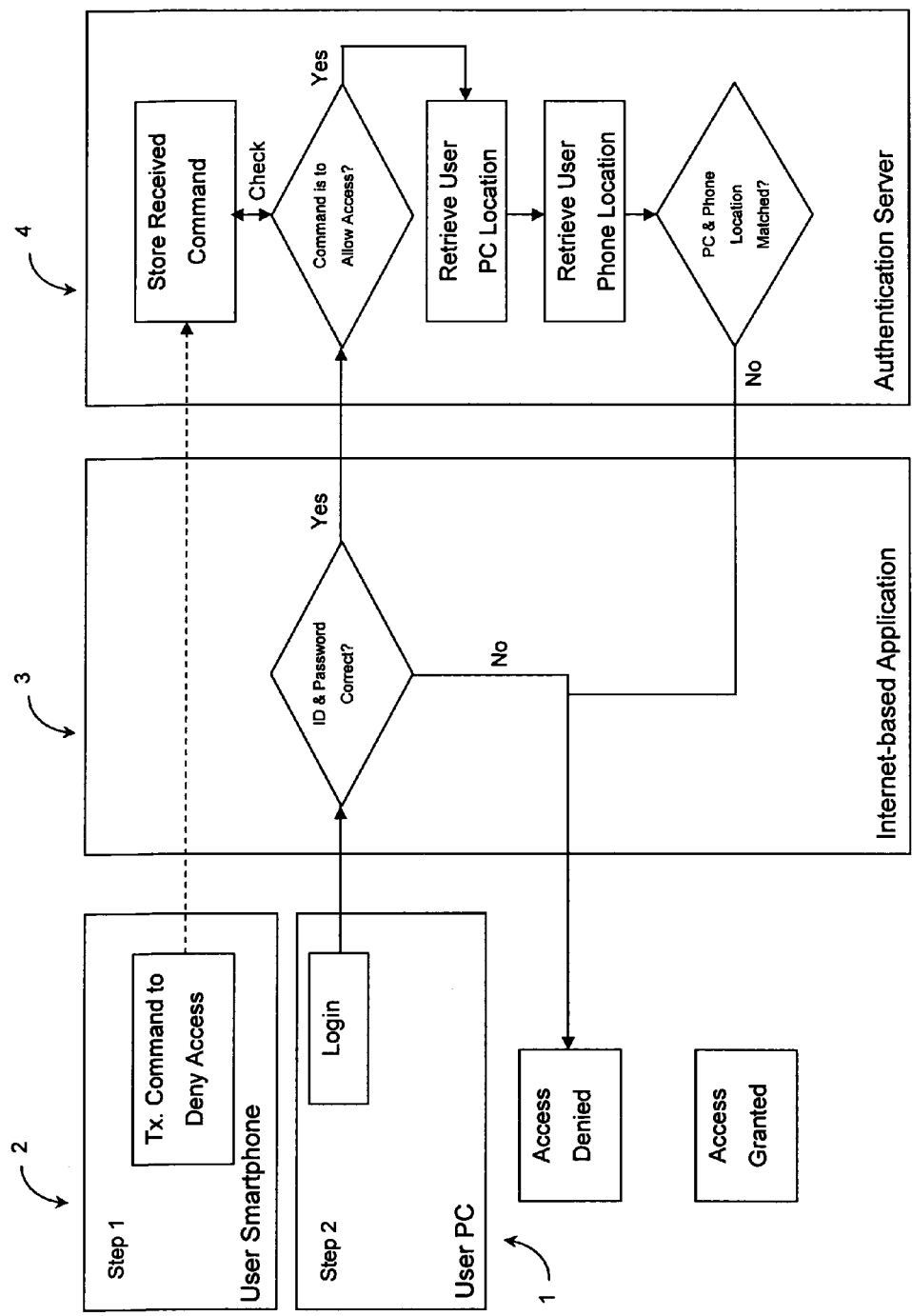
FIG. 4 is a flow chart illustrating the second embodiment of the invention when the user first initiates the transmission of a command by a second internet-capable device for allowing access to an internet-based application by a first internet-capable device, when the geographical locations of the first and second devices are not in proximity to each other.

FIG. 4 specifically illustrates the second embodiment of the invention when a registered user first initiates the transmission of a command by a second internet-capable device to allow access to an internet-based application by a first internet-capable device, when the geographical locations of the first and second devices are not in proximity to each other.

When a registered user of an online service provider's website 3 (such as an internet banking account) wishes to access his/her online account through a first internet-capable device 1 (such as his/her personal computer), the registered user will first transmit a command from a second internet-capable device 2 (such as his/her Smartphone) to allow access to his/her online account.

The command to allow access is received by the authentication server 4 which determines the identity of the second internet-capable device 2 by comparing the unique authentication code which the command comprises, with a list of such codes stored in a database.

The authentication server 4 will also determine the geographical locations of the first and second internet-capable devices, and compare whether the two devices are in proximity to each other.

Upon determining that the second internet-capable device 2 indeed belongs to a registered user, and determining that both the first and second internet-capable devices are not in proximity to each other, i.e. in this specific embodiment that the city and country information for the two devices do not tally, the authentication server 4 will deny access to the user's online account, regardless of whether the login credentials submitted by a registered user are valid.

In the second embodiment of the present invention illustrated in FIG. 3 and FIG. 4, a registered user uses a second internet-capable device which must be in proximity to the first internet-capable device, to "switch ON" access to his/her online account, in addition to submitting through the first internet-capable device his/her valid login credentials which are authenticated before access to the online account is granted.

The usage of the present invention is however, not limited to a registered user having to make use of both a first and a second internet-capable device in the method of controlling access to an internet-based application.

Given the advanced capabilities of present generation portable internet-capable devices such as Smartphones, and the high level of internet connectivity of such devices, it is highly conceivable that a registered user may only possess and/or prefer to utilize a single device to access an internet-based application.

This possibility is catered for in a third embodiment of the present invention.

In a third embodiment of the present invention, the method involves controlling the access to an internet-based application 3 requiring the submission of valid login credentials by a registered user through an internet-capable device 5, and the method comprises the steps of:

a) receiving, at a computer server 4, a command comprising a unique authentication code transmitted via the internet by the internet-capable device 5, the transmission of that code being initiated by the user;

b) the computer server 4 determining the identity of the device by comparing the received code with a plurality of such codes that are stored in a database, each code associated with a different registered user of the application;

c) the computer server 4 setting an access control status based on said command, upon validly determining the identity in step b); and d) the computer server 4, based on the access control status, determining access to the application 3 upon submission of the valid login credentials through the device.

The internet-based application 3 accessed by the registered user would typically be an online service provider, such as an internet banking website.

The internet-capable device 5 utilized by the registered user to transmit the command would typically be a personal portable device such as a Smartphone or tablet which belongs to a registered user.

The command transmitted by the internet-capable device 5 is generated by the registered user activating a device-based application on the device. Since the internet-capable device 5 is typically a Smartphone, the device-based application may take the form of a specialized Smartphone application, commonly known as an 'app'.

The device-based application is provided to a user as part of the process of registering a user account with the online service provider's website, which will also involve associating the user's account with identifiers associated to the user and the user's internet-capable device. In practice, an online service provider will maintain a secure database of the user identifier and the Smartphone identifier of every registered user, which will be used to determine and authenticate the identity of a registered user.

The computer server may typically be an authentication server 4 linked to the online service provider's website which has access to the secure database mentioned in the preceding paragraph, although other server arrangements may be envisioned by a person skilled in the art.

A user identifier would generally take the form of a registered user's login credentials, such as a user ID and a password.

The authentication code which the command transmitted by the internet-capable device 5 comprises, may in turn comprise a unique identification code that is integral to the device, and preferably also includes a user identifier associated with the registered user as well.

As in the first embodiment of the present invention, the authentication code may also encrypted by the device-based application for added security.

The unique identification code will depend on the type of the internet-capable device, and may for example be the International Mobile Equipment Identifier (IMEI), Mobile Equipment Identifier (MEID) or Electronic Serial Number (ESN) of the second internet capable device. Alternatively, if the device is Bluetooth®-enabled, the device's unique Bluetooth® address could be used.

Figure 5:
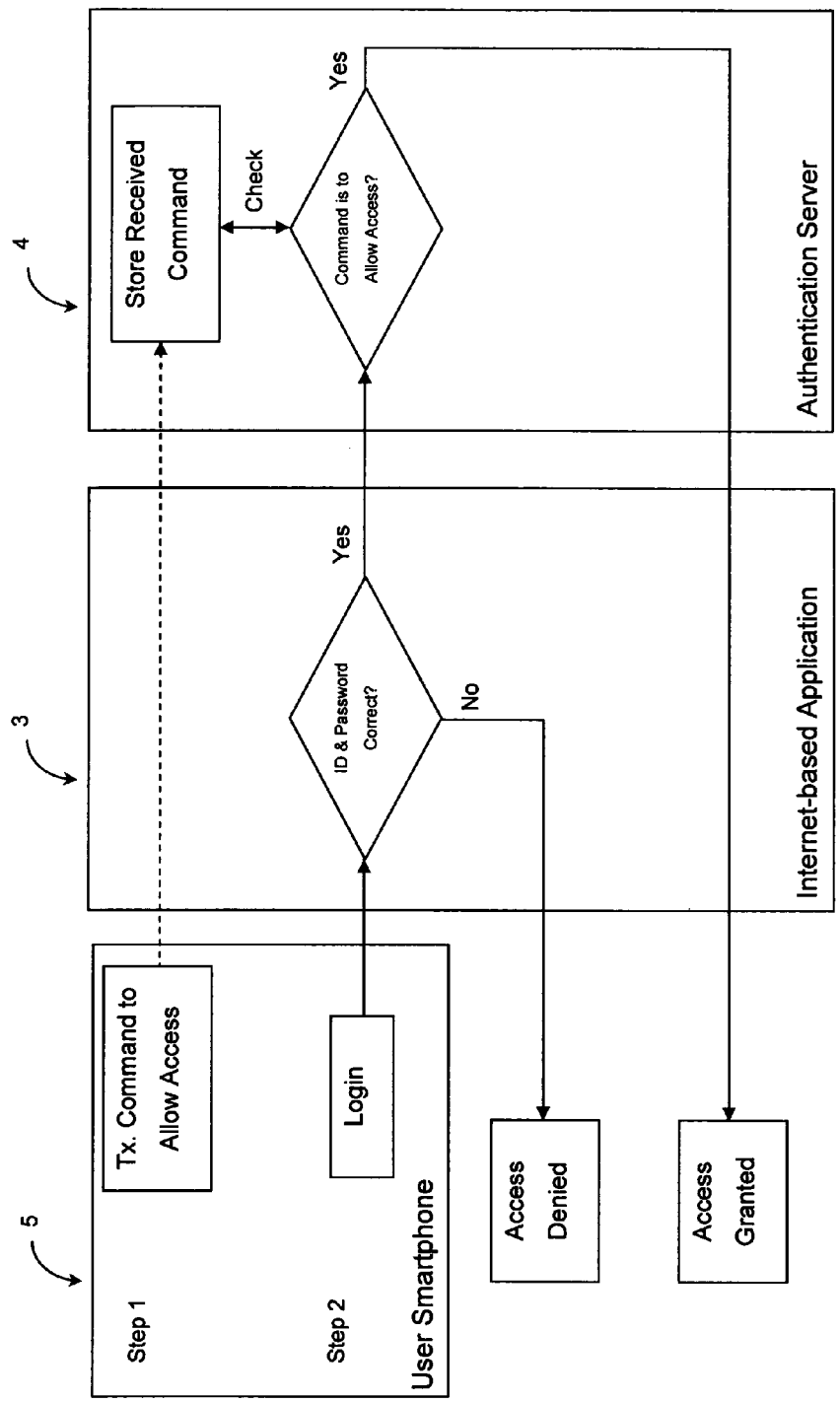
FIG. 5 is a flow chart illustrating a third embodiment of the invention when the user first initiates the transmission of a command by an internet-capable device to allow access to an internet-based application by the internet-capable device.

FIG. 5 specifically illustrates the third embodiment of the invention when a registered user first initiates the transmission of a command via the internet by an internet-capable device (such as his/her Smartphone) to allow access to an internet-based application by the same device.

When a registered user of an online service provider's website 3 wishes to access his/her online account through an internet-capable device 5, the registered user will first transmit a command from the internet-capable device to allow access to his/her online account.

The command to allow access is received by the authentication server 4 which determines the identity of the internet-capable device 5 by comparing the unique authentication code which the command comprises, with a list of such codes stored in a database. Upon determining that the internet-capable device 5 indeed belongs to a registered user, the authentication server 4 will determine the identity of the registered user by verifying that the login credentials submitted by a registered user are valid, before the user is allowed to access his/her online account.

A registered user in other words uses an internet-capable device 5 to "switch ON" access to his/her online account, in addition to submitting through the device, his/her valid login credentials which are authenticated before access to the user's online account is granted.

Figure 6:
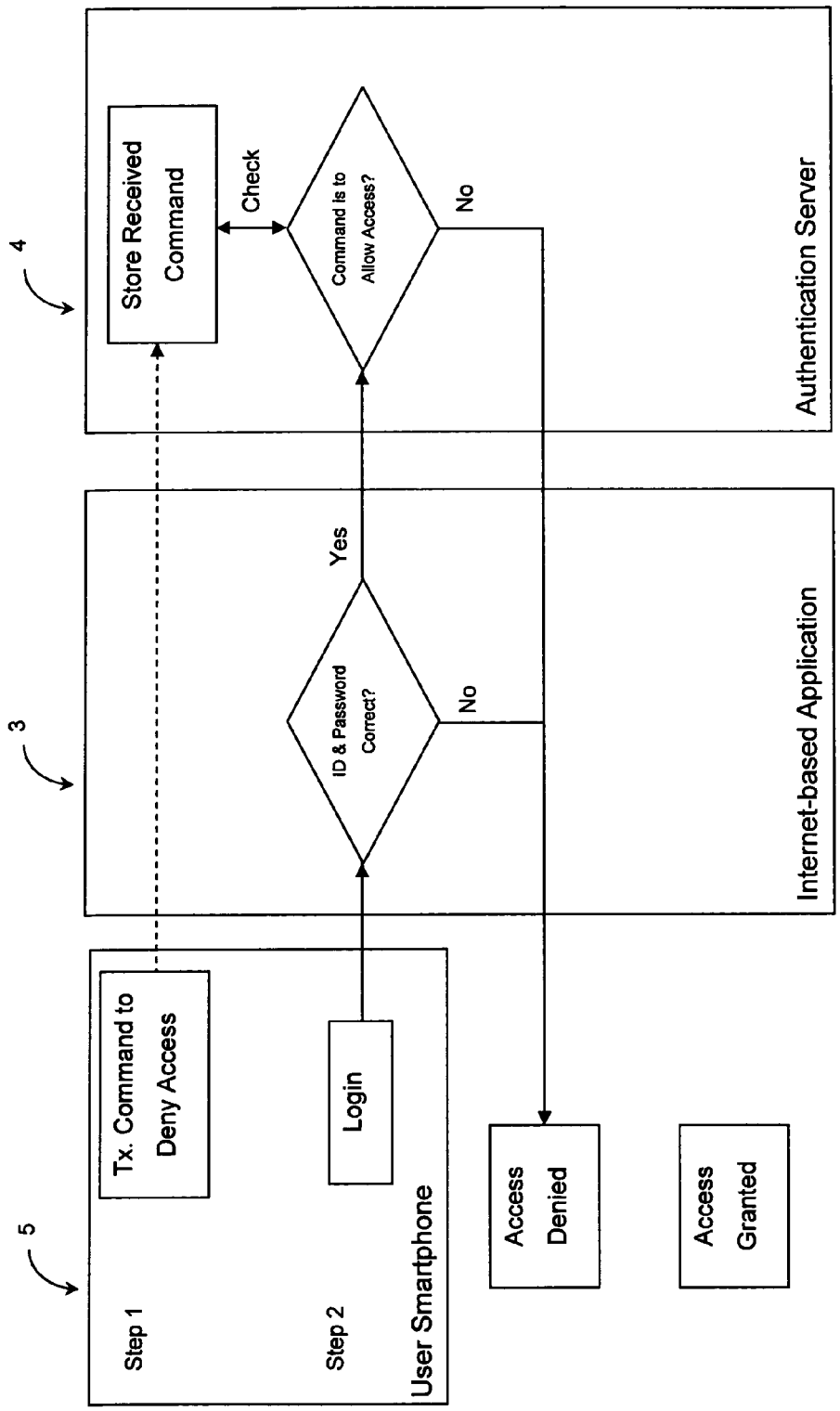
FIG. 6 is a flow chart illustrating the third embodiment of the invention when the user first initiates the transmission of a command by an internet-capable device to deny access to an internet-based application.

FIG. 6 specifically illustrates the third embodiment of the invention when a registered user first initiates the transmission of a command by an internet-capable device (such as his/her Smartphone) to deny access to an internet-based application.

When a registered user of an online service provider's website 3 wishes to deny access to his/her account, the registered user will first transmit a command from the internet-capable device 5 to deny access to his/her online account.

The command to deny access is received by the authentication server 4 which determines the identity of the internet-capable device 5 by comparing the unique authentication code which the command comprises, with a list of such codes stored in a database. Upon determining that the internet-capable device 5 indeed belongs to a registered user, the authentication server 4 will deny access to the registered user's online account. Hereafter, any attempt by the registered user or any other party to submit even valid login credentials will not result in access to the registered user's online account being granted.

A registered user in other words, uses an internet-capable device to "switch OFF" access to his/her account. Once access has been denied, the submission of any login credentials through the internet-capable device 5, valid or otherwise will be rejected.

In the embodiments of the invention described here, the process of registering a user account would in practice typically be an online procedure, whereby a user first accesses the online service provider's website (i.e., internet-based application) through a personal computer, laptop or tablet (i.e., a first internet-capable device) to create a new user account. The website will then check whether the user has a Smartphone (i.e., a second internet-capable device) registered with the website.

If the user does not have a Smartphone registered with the online service provider's website, the user is prompted and directed to download an 'app' (i.e., a device-based application) from an official application repository provided by the Smartphone platform.

After the user installs the 'app' into the Smartphone, the online service provider's website sends a text message to the user's Smartphone containing the user's user ID, the internet address of the authentication server and a unique registration code for the user to register his/her Smartphone with the online service provider's website. The information contained in the text message are encrypted to prevent tampering.

The 'app' would then carry out the registration of the user's Smartphone using the contents of the text message, thus completing the process of registering a user account.

In the embodiments of the invention described here, the unique authentication code comprises the user ID and Smartphone serial number (e.g., IMEI) of a registered user, a time stamp in Coordinated Universal Time (UTC) format and a control signature attributed to the SHA-1 hash function encryption scheme used. The user ID and the Smartphone IMEI number are used as the unique identification code. The time stamp provides additional information for checking if the continually transmitted geographical location information applicable to the second embodiment is up to date. The control signature is to ensure that the encrypted information contained in the unique authentication code has not been tampered with or compromised.

In the embodiments of the invention described here, the validity of the command to allow access transmitted by the second internet-capable device in the first and second embodiments, or the single internet-capable device in the third embodiment is subject to expiry or Timing-Out after a predetermined period of non-activity by a registered user. The granting of access to an internet-based application is further dependent on the command to allow access remaining valid, and the authentication server is therefore required to determine if the command to allow access has expired, when determining whether the login credentials submitted by a registered user are to be accepted and treated as valid.

The present invention is not limited to the embodiments described here, as the description serves only to exemplify the invention and possible variations and modifications are readily apparent without departing from the scope of the invention. By way of example, although the described embodiments contemplate the user selectively switching ON access whenever he/she wishes to access the internet-based application, it is also within the scope of the present invention that the status is normally set ON by default. The user then only bars access to the application by activating the device-based application to switch OFF access in the event a possible or actual breach of his security is detected. As another example, for the embodiments relating to the use of geographical location data, the comparison of the locations may only be made in certain circumstances rather than routinely as a pre-requisite for access to be enabled. For instance, the service provider or computer server may store the IP address or addresses from which a user normally accesses the internet-based application. Then, the geographical location check is only invoked if the user attempts to access the application from an IP address not previously used and stored, since that may suggest suspicious unauthorized access is being attempted.

The invention claimed is:

1. A method of controlling access to an internet-based application (3) through a first internet-capable device (1), said application (3) requiring the submission of valid login credentials by a registered user of said application (3), the method comprising the steps of:
   a) a computer server (4) receiving a command comprising a unique authentication code transmitted via the internet by a second internet-capable device (2) associated with the user, the transmission of that code being initiated by the user, wherein the unique authentication code comprises a unique identification code that is integral to the second device (2) and a time stamp;
   b) said computer server (4) determining the identity of the second device (2) by comparing the received unique identification code with a plurality of unique identification codes that are stored in a database, each unique identification code associated with a different registered user of said application (3);
   c) said computer server (4) setting an access control status based on said command, upon validly determining the identity in step b), wherein the access control status may be set to i) allow access to said application (3), or ii) deny access to said application (3); and
   d) said computer server (4):
      i) when the access control status is set to allow access to said application (3), allowing access to said application (3) upon submission of the valid login credentials through said first device (1), and
      ii) when the access control status is set to deny access to said application (3), denying access to said application (3) even upon submission of the valid login credentials through said first device (1).

2. The method according to claim 1, wherein the computer server (4) sets the access control status to allow access to said application (3) in step c) when said command is for allowing access to said application (3).

3. The method according to claim 1, wherein the computer server (4) sets the access control status to deny access to said application (3) in step c) when said command is for denying access to the said application (3).

4. The method according to claim 1, wherein the command received in step a) is generated by the user activating a device-based application on said second device (2).

5. The method according to claim 4, wherein the authentication code is encrypted by the device-based application.

6. The method according to claim 1, wherein the authentication code further comprises a user identifier associated with the registered user.

7. The method according to claim 1, wherein the unique identification code is an International Mobile Equipment Identifier (IMEI), Mobile Equipment Identifier (MEID) or Electronic Serial Number (ESN) of the second device (2).

8. The method according to claim 1, wherein the computer server (4) is an authentication server linked to said application (3).

9. The method according to claim 1, wherein the second internet-capable device (2) is a mobile device.

10. The method according to claim 1, wherein the first-internet capable device (1) is a personal computing device.

11. The method according to claim 1, wherein the method further comprises prior to step c), the additional steps of:
    said computer server (4) comparing the respective geographical locations of the first and second internet-capable devices; and
    said computer server (4) determining whether the geographical locations of the first and second internet-capable devices are in proximity to one another.

12. The method according to claim 11, wherein step c) of the computer server (4) setting an access control status based on said command, is further dependent upon determining that the geographical locations of the first and second internet-capable devices are in proximity to one another.

13. The method according to claim 11, wherein the geographical location of each of the first and second internet-capable devices compared at the computer server (4) is city and country information.

14. The method according to claim 11, wherein the geographical location of the first device (1) is derived by IP address analysis.

15. The method according to claim 11, wherein the geographical location of the second device (2) is derived from one or more of satellite signals, mobile communication cell tower information and Wi-Fi access point information.

* * * * *

UNITED STATES PATENT AND TRADEMARK OFFICE
CERTIFICATE OF CORRECTION

| | |
|---|---|
| PATENT NO. | : 9,628,460 B2 |
| APPLICATION NO. | : 14/345878 |
| DATED | : April 18, 2017 |
| INVENTOR(S) | : Chik Weng Leong et al. |

It is certified that error appears in the above-identified patent and that said Letters Patent is hereby corrected as shown below:

On the Title Page (75), Inventors: "Lampur" should read --Lumpur--

Signed and Sealed this
Thirty-first Day of October, 2017

Joseph Matal
*Performing the Functions and Duties of the
Under Secretary of Commerce for Intellectual Property and
Director of the United States Patent and Trademark Office*